United States Patent [19]
Hough

[11] Patent Number: 5,414,621
[45] Date of Patent: May 9, 1995

[54] SYSTEM AND METHOD FOR COMPUTING A COMPARATIVE VALUE OF REAL ESTATE

[76] Inventor: John R. Hough, 19014 Capehart Dr., Gaithersburg, Md. 20879

[21] Appl. No.: 846,932

[22] Filed: Mar. 6, 1992

[51] Int. Cl.$^6$ .................. G06G 7/52; G06F 15/30
[52] U.S. Cl. ........................ 364/401; 364/406; 364/408
[58] Field of Search ............ 364/400, 401, 402, 408, 364/406

[56] References Cited

U.S. PATENT DOCUMENTS

| | | | |
|---|---|---|---|
| 4,648,037 | 3/1987 | Valentino | 364/408 |
| 4,742,457 | 5/1988 | Leon et al. | 364/408 |
| 4,831,526 | 5/1989 | Luchs et al. | 364/401 |
| 5,006,998 | 4/1991 | Yasunobu et al. | 364/513 |
| 5,032,989 | 7/1991 | Tornetta | 364/401 |
| 5,083,270 | 1/1992 | Gross et al. | 364/408 |

OTHER PUBLICATIONS

Gazis–"Real Estate Investment Analysis System", IBM Technical Disclosure Bulletin, vol. 13, No. 11, Apr. 1971, pp. 3274–3275.

*Primary Examiner*—Gail O. Hayes
*Assistant Examiner*—Joseph Thomas
*Attorney, Agent, or Firm*—Jacobson, Price, Holman & Stern

[57] ABSTRACT

A system and method for determining comparative values of comparable properties based on assessment percentages and sales data of the comparable properties to ultimately determine a value for a subject property. In a first embodiment, the "assessment percentage" is the "base property tax" for the subject property and comparable property. A price/tax factor is computed for each comparable property by dividing the sale (or sold) price of the comparable property by its base tax. The price/tax factor for each comparable property is then multiplied by the base tax of the subject property to generate a net comparative value for each comparable property. To take into account appreciation for recently sold comparable properties, an average appreciation is obtained for the area in which the subject and comparable properties are located. The average appreciation is pro rated to determine the comparative value for each comparable property. On the basis of the comparative values and other pertinent information, the value of the subject property may be set by a real estate agent, bank, appraiser, etc. In second and third embodiments, the "assessment percentage" is the "assessed value" and "phase value", respectively, which are used to compute the comparative values in a manner similar to the first embodiment.

5 Claims, 20 Drawing Sheets

SUBJECT PROPERTY — TAX ACCOUNT NUMBER
FOR

HOME FEATURES

TAX ACCOUNT ID
HOUSE NUMBER
STREET
MONTH AND YEAR

AGE
LOT SIZE
TYPE
STYLE
BEDROOMS
BATHS
EXTERIOR
FIREPLACE
BASEMENT
FAMILY ROOM
REC. ROOM
DECK
PARKING
KITCHEN
DINING ROOM
FENCED YARD
MODEL

ESC — F2 — F3 — F5 — F9 — TAB — PAGE UP — PAGE DOWN
EXIT SAVE REMARKS TABLE PRINT FORMULA

FIG. 4

```
                    SUBJECT PROPERTY—TAX ACCOUNT NUMBER
                                   FOR

TAX ACCOUNT ID
HOUSE NUMBER
STREET
MONTH AND YEAR

SELECT SUBJECT PROPERTY
        ADDRESS                     CITY             TAX ACCOUNT

CLOVERDALE PL   13421         Germantown            12211
   CLOVERDALE PL   13424         Germantown            90000

[ENTER]-SELECT              [ESC]-EXIT
              [SEARCH]-STREET NAME        [F4]-TAX NUMBER

FEN
MODEL
ESC     F2     F3     F5     F9     TAB     PAGE UP     PAGE DOWN
EXIT   SAVE  REMARKS TABLE  PRINT                        FORMULA
```

FIG. 5

SUBJECT PROPERTY - SPECIAL FEATURES (5 lines)
FOR

TAX ACCOUNT ID
HOUSE NUMBER
STREET
MONTH AND YEAR

———— HOME FEATURES ————

AGE
LOT SIZE
TYPE
STYLE
BEDROOMS
BATHS
EXTERIOR
FIREPLACE
BASEMENT
FAMILY ROOM
REC. ROOM
DE
PA
KI
DI
FE
MO

———— REMARKS ————

[ESC] — [F2]
EXIT    SAVE

FIG. 6

SUBJECT PROPERTY — TOTAL TAX BILL
FOR

TAX ACCOUNT ID
HOUSE NUMBER
STREET
MONTH AND YEAR

———————— FORMULA ————————

TAX BILL         0
FFBC             0
SPECIAL TAX      0
BASE TAX         0

ESC —— F2 —— F3 —— F5 —— F9 —— TAB —— PAGE UP —— PAGE DOWN
EXIT  SAVE        PRINT         FEATURES   COMPS SOLD

FIG. 7

```
TAX ACCOUNT ID ———————— COMPS SOLD ———— TAX ACCOUNT NUMBER
HOUSE NUMBER
STREET
MONTH AND YEAR

AGE                      ———————— HOME FEATURES
LOT SIZE
TYPE
STYLE
BEDROOMS
BATHS
EXTERIOR
FIREPLACE
BASEMENT
FAMILY ROOM
REC. ROOM
DECK
PARKING
KITCHEN
DINING ROOM
FENCED YARD
MODEL
ESC ——— F2 ——— F3 ——— F5 ——— F9 ——— TAB ——— PAGE UP ——— PAGE DOWN
EXIT  SAVE  REMARKS  TABLE  PRINT NEXT      SUBJECT     FORMULA
```

FIG. 8

|  | COMPS SOLD | TOTAL TAX BILL |
|---|---|---|
|  | FORMULA |  |
| TAX ACCOUNT ID |  |  |
| HOUSE NUMBER |  |  |
| STREET |  |  |
| MONTH AND YEAR |  |  |
| TAX BILL | 0 | 0 |
| FFBC | 0 | 0 |
| SPECIAL TAX | 0 | 0 |
| BASE TAX | 0 | 0 |
| LIST PRICE | 0 | 0 |
| SALE PRICE | 0 | 0 |
| FACTOR | 0.00 | 0.00 |
| SUBJECT TAX | 0 | 0.00 |
| NET VALUE | 0 | 0.00 |
| YEAR APPREC % | 0.0 | 0.0 |
| NET # MONTHS | 0.0 | 0.0 |
| NET APPREC % | 0 | 0.0 |
| VALUE | 0 | 0 |
| ADJUSTMENT | 0 | 0 |
| ADJUSTED VALUE |  | 0 |

ESC —— F2 —— F3 —— F5 —— F9 —— TAB —— PAGE UP —— PAGE DOWN
EXIT SAVE TABLE PRINT NEXT FEATURES UNSOLD

FIG.9

TAX ACCOUNT ID
HOUSE NUMBER ———— UNSOLD ———— TAX ACCOUNT NUMBER
STREET
MONTH AND YEAR

HOME FEATURES

AGE
LOT SIZE
TYPE
STYLE
BEDROOMS
BATHS
EXTERIOR
FIREPLACE
BASEMENT
FAMILY ROOM
REC. ROOM
DECK
PARKING
KITCHEN
DINING ROOM
FENCED YARD
MODEL

ESC —— F2 —— F3 —— F5 —— F9 —— TAB —— PAGE UP —— PAGE DOWN
EXIT  SAVE  REMARKS  TABLE  PRINT  NEXT  COMPS SOLD  FORMULA

FIG. 10

|                    |        | ——— UNSOLD ——— TOTAL TAX BILL |      |
|--------------------|--------|-------------------------------|------|
| TAX ACCOUNT ID     |        |                               |      |
| HOUSE NUMBER       |        |                               |      |
| STREET             |        |                               |      |
| MONTH AND YEAR     |        .                              |      |
|                    |        | FORMULA                       |      |
| TAX BILL           | 0      | 0                             | 0    |
| FFBC               | 0      | 0                             | 0    |
| SPECIAL TAX        | 0      | 0                             | 0    |
| BASE TAX           |        | 0                             | 0    |
| LIST PRICE         | 0      |                               |      |
| FACTOR             | 0.00   | 0.00                          | 0.00 |
| SUBJECT TAX        | 0      | 0                             | 0    |
| VALUE              | 0      | 0                             | 0    |
| AVG VALUE UNSOLD   | 0 HIGH:| 0 LOW:                        | 0    |
| AVG VALUE SOLD     | 0      |                               |      |

ESC ——— F2 ——— F3 ——— F5 ——— F9 ——— TAB ——— PAGE UP ——— PAGE DOWN
EXIT  SAVE        TABLE PRINT NEXT    FEATURES

```
*************    HOMES SOLD    *************

SUBJECT         ONE              TWO            THREE

STREET : Maple Leaf    Maple Leaf      Maple Leaf      Tambay
  NUMBER :    10055         9910            10001         9933

TAX BILL:    1462          1524            1523          1554
     FFBC:    260           260             260           260
 SPEC TAX:     0             0               0             0
 BASE TAX:    1202          1264            1263          1294

MONTH #:     10            5               4             4
     YEAR:     91            91              91            91

FEATURES
      age:     10            11              11            10
 lot size:    1400          2100            2100          2100
     type:ATT/ROW        END UNIT        END UNIT      END UNIT
    style:TH              TH              TH            TH
 bedrooms:     3             3               3             3
    baths:FB2,HB2         FB2,HB2         FB2,HB1       FB2,HB1
 exterior:WOOD            BRICK           BRICK         BRICK
 fireplce:FR              LR              LR            LR
 basement:FIN,W/O         FIN             FIN           FIN
 fam. rm.:BASEMENT        BASEMENT        BASEMENT      BASEMENT
 rec. rm.:
     deck:NO              NO              NO            NO
  parking:OFF STREE       OFF STREET      OFF STREET    OFF STREET
  kitchen:TBL SPACE       TBL SPACE       TBL SPACE     TBL SPACE
   dining:FORMAL          FORMAL          FORMAL        FORMAL
 fncd yrd:
    model:HAMPSTEAD       WHITFORD        WHITFORD      WHITFORD
  REMARKS:                NEW CARPET                    WET BAR
 BACKS TO WOODS           NEW APPLIANCES
 NEW CARPET               OAK FLOORS
           SOLD $:        144500          135000        135000
 BASE TAX:                1264            1263          1294
   FACTOR:                114.3196        106.8883      104.3276
 SUBJ TAX:                1202            1202          1202
 NET VALU:                137412.1        128479.8      125401.8
 YR APPR%:                 4               4             4
 NET # MO:                 5               6             6
 APPRE+/-:                1.666666         2             2
    VALUE:                139702.3        131049.4      127909.8

POINTS:                1300            0             0
  CLOSING:                2800            1500          0
 IMPROVED:
   ADJUST:                -4100           -1500

ADJ VALU:                135602.3        129549.4      127909.8
```

FIG. 13

```
************   HOMES NOT SOLD   *************

SUBJECT         ONE           TWO           THREE

STREET :  Maple Leaf     Maple Leaf    Maple Leaf    Maple Leaf
NUMBER:     10055          10046         9904          10069

TAX BILL:    1462           1328          1348          1346
    FFBC:     260            260           260           260
SPEC TAX:       0              0             0             0
BASE TAX:    1202           1068          1088          1086

FEATURES
     age:      10             11            11            11
lot size:    1400           1870          1400          1400
    type: ATT/ROW ,       END UNIT      ATT/ROW       ATT/ROW
   style: TH              TH            TH            TH
bedrooms:       3              3             3             3
   baths: FB2,HB2         FB2,HB2       FB2,HB1       FB2,HB1
exterior: WOOD            BRICK         BRICK,WOOD    BRICK,WOO
fireplce: FR
basement: FIN,W/O         FIN           FIN           FIN
 fam. rm.: BASEMENT       BASEMENT      BASEMENT      BASEMENT
 rec. rm.:      0              0             0             0
    deck: NO              YES           NO            NO
 parking: OFF STREET      OFF STREET    OFF STREET    OFF STREET
 kitchen: TBL SPACE       TBL SPACE     TBL SPACE     TBL SPACE
  dining: FORMAL          COUNTRY KIT   COUNTRY KIT   COMBO
fncd yrd:       0                       YES
   model: HAMPSTEAD                     FALLSTON
 REMARKS:       0         UPGRADED                    BAR
BACKS TO WOODS            HRDW FLOORS                 GD SHAPE
NEW CARPET                BACKS WOODS SALE $:        130900        129900        127900
          ADJUST:
BASE TAX:                  1068          1088          1086
  FACTOR:               122.5655      119.3933      117.7716
SUBJ TAX:                  1202          1202          1202
   VALUE:               147323.7      143510.8      141561.4

AVERAGE NET OF NOT SOLD: 144132.0
AVERAGE NET OF SOLD    : 131020.5    HIGH:137571.5  LOW:128400.1
```

FIG. 15

```
*************    HOMES SOLD    *************
           SUBJECT         ONE            TWO            THREE

STREET  : Maple Leaf     Maple Leaf     Maple Leaf     Tambay
NUMBER  :   10055          9910           10001          9933

ASSESSED
VALUE:      45080          49310          47690          50300

MONTH #:   10             5              4              4
   YEAR:   91              91             91             91

FEATURES
     age:   10             11             11             10
lot size: 1400             2100           2100           2100
    type:ATT/ROW         END UNIT       END UNIT       END UNIT
   style:TH              TH             TH             TH
bedrooms:   3              3              3              3
   baths:FB2,HB2         FB2,HB2        FB2,HB1        FB2,HB1
exterior:WOOD            BRICK          BRICK          BRICK
fireplce:FR              LR             LR             LR
basement:FIN,W/O         FIN            FIN            FIN
fam. rm.:BASEMENT        BASEMENT       BASEMENT       BASEMENT
rec. rm.:
    deck:NO              NO             NO             NO
 parking:OFF STREE       OFF STREET     OFF STREET     OFF STREET
 kitchen:TBL SPACE       TBL SPACE      TBL SPACE      TBL SPACE
  dining:FORMAL          FORMAL         FORMAL         FORMAL
fncd yrd:
   model:HAMPSTEAD       WHITFORD       WHITFORD       WHITFORD
 REMARKS:                NEW CARPET                    WET BAR
BACKS TO WOODS           NEW APPLIANCES
NEW CARPET               OAK FLOORS
              SOLD $:    144500         135000         135000
ASSESSED VALUE SOLD:     49310          47690          50300
             FACTOR:     2.930440       2.830782       2.683896
ASSESSED VALUE SUBJECT:  45080          45080          45080
           NET VALU:     132104.2       127611.6       120990.0
           YR APPR%:     4              4              4
            NET # MO:    5              6              6
            APPRE+/-:    1.666666       2              2
              VALUE:     134305.9       130163.8       123409.8

POINTS:              1300           0              0
   CLOSING:              2800           1500           0
  IMPROVED:
    ADJUST:              -4100          -1500

ADJ VALU:              130205.9       128663.8       123409.8
```

FIG. 16

```
************    HOMES NOT SOLD    *************

SUBJECT         ONE            TWO            THREE

STREET : Maple Leaf     Maple Leaf     Maple Leaf     Maple Leaf
NUMBER:    10055           10046          9904           10069

ASSESSED
VALUE:     45080           41900          42450          41930

FEATURES
    age:      10              11             11             11
lot size:   1400            1870           1400           1400
   type:ATT/ROW          END UNIT       ATT/ROW        ATT/ROW
  style:TH               TH             TH             TH
bedrooms:      3               3              3              3
  baths:FB2,HB2          FB2,HB2        FB2,HB1        FB2,HB1
exterior:WOOD            BRICK          BRICK,WOOD     BRICK,WOO
fireplce:FR
basement:FIN,W/O         FIN            FIN            FIN
fam. rm.:BASEMENT        BASEMENT       BASEMENT       BASEMENT
rec. rm.:      0               0              0              0
   deck:NO               YES            NO             NO
parking:OFF STREET       OFF STREET     OFF STREET     OFF STREET
kitchen:TBL SPACE        TBL SPACE      TBL SPACE      TBL SPACE
 dining:FORMAL           COUNTRY KIT    COUNTRY KIT    COMBO
fncd yrd:      0                        YES
  model:HAMPSTEAD                       FALLSTON
REMARKS:       0         UPGRADED                      BAR
BACKS TO WOODS           HRDW FLOORS                   GD SHAPE
NEW CARPET               BACKS WOODS SALE $:      130900         129900         127900
            ADJUST:
ASSESSED VALUE SOLD:      41900          42450          41930
            FACTOR:     3.124105       3.060070       3.050321
ASSESSED VALUE SUBJECT:   45080          45080          45080
NET VALU:                140834.6       137947.9       137508.4

AVERAGE NET OF NOT SOLD: 138763.7
AVERAGE NET OF SOLD    : 127426.5    HIGH:133790.8  LOW:124878.0
```

FIG. 18

```
*************** HOMES SOLD ***************
           SUBJECT         ONE            TWO            THREE

STREET  : Maple Leaf    Maple Leaf     Maple Leaf     Tambay
NUMBER  :    10055         9910           10001          9933

PHASE
VALUE:      112703        123293         119226         125760

MONTH #:       10             5              4              4
    YEAR:       91            91             91             91

FEATURES
       age:      10            11             11             10
  lot size:    1400          2100           2100           2100
      type:ATT/ROW       END UNIT       END UNIT       END UNIT
     style:TH            TH             TH             TH
  bedrooms:       3             3              3              3
     baths:FB2,HB2       FB2,HB2        FB2,HB1        FB2,HB1
  exterior:WOOD          BRICK          BRICK          BRICK
  fireplce:FR            LR             LR             LR
  basement:FIN,W/O       FIN            FIN            FIN
  fam. rm.:BASEMENT      BASEMENT       BASEMENT       BASEMENT
  rec. rm.:
      deck:NO            NO             NO             NO
   parking:OFF STREE     OFF STREET     OFF STREET     OFF STREET
   kitchen:TBL SPACE     TBL SPACE      TBL SPACE      TBL SPACE
    dining:FORMAL        FORMAL         FORMAL         FORMAL
  fncd yrd:
     model:HAMPSTEAD     WHITFORD       WHITFORD       WHITFORD
   REMARKS:              NEW CARPET                    WET BAR
BACKS TO WOODS           NEW APPLIANCES
NEW CARPET               OAK FLOORS
            SOLD $:      144500         135000         135000
PHASE VALUE SOLD:        123293         119226         125760
    FACTOR:              1.172004       1.132303       1.073473
PHASE VALUE SUBJECT:     112703         112703         112703
NET VALU:                132088.4       127613.9       120983.6
YR APPR%:                      4              4              4
NET # MO:                      5              6              6
APPRE+/-:                1.666666              2              2
    VALUE:               134289.9       130166.2       123403.3

POINTS:                1300              0              0
   CLOSING:                2800           1500              0
  IMPROVED:
    ADJUST:               -4100          -1500

ADJ VALU:               130189.9       128666.2       123403.3
```

FIG. 19

```
************   HOMES NOT SOLD   ************
             SUBJECT         ONE              TWO             THREE

STREET  : Maple Leaf      Maple Leaf       Maple Leaf      Maple Leaf
NUMBER:      10055           10046             9904            10069

PHASE
VALUE:      112703          104770           106136          104836

FEATURES
     age:       10             11               11              11
lot size:    1400            1870             1400            1400
    type:ATT/ROW         END UNIT         ATT/ROW         ATT/ROW
   style:TH              TH               TH              TH
bedrooms:       3              3                3               3
   baths:FB2,HB2         FB2,HB2          FB2,HB1         FB2,HB1
exterior:WOOD            BRICK            BRICK,WOOD      BRICK,WOO
fireplce:FR
basement:FIN,W/O         FIN              FIN             FIN
fam. rm.:BASEMENT        BASEMENT         BASEMENT        BASEMENT
 rec. rm.:     0                0                0               0
    deck:NO              YES              NO              NO
 parking:OFF STREET      OFF STREET       OFF STREET      OFF STREET
 kitchen:TBL SPACE       TBL SPACE        TBL SPACE       TBL SPACE
  dining:FORMAL          COUNTRY KIT      COUNTRY KIT     COMBO
fncd yrd:      0                          YES
   model:HAMPSTEAD                        FALLSTON
 REMARKS:      0         UPGRADED                         BAR
BACKS TO WOODS           HRDW FLOORS                      GD SHAPE
NEW CARPET               BACKS WOODS SALE $:    130900           129900          127900
              ADJUST:
PHASE VALUE   SOLD:      104770           106136          104836
    FACTOR:            1.249403         1.223901        1.220000
PHASE VALUE SUBJECT:     112703           112703          112703
NET VALU:                140811.5         137937.3        137497.7

AVERAGE NET OF NOT SOLD: 138748.8
AVERAGE NET OF SOLD    : 127419.8         HIGH:133790.8  LOW:124871.4
```

SYSTEM AND METHOD FOR COMPUTING A COMPARATIVE VALUE OF REAL ESTATE

BACKGROUND OF THE INVENTION

The present invention relates to a system and method for computing the value of real estate.

It is often necessary to determine the value of property, particularly in real estate sales, mortgage transactions and other transactions relying on the current fair market value of property. A common method for determining the value of property is the comparative marketing analysis (CMA). However, CMA has some deficiencies. It involves "guess work" on the part of the appraiser and, therefore, often lacks accuracy.

Banks, appraisers and investors in the secondary market that buy mortgages need accurate fair market value information of property. Moreover, a standard in the property appraising industry would be helpful for spotting "bad" appraisals.

SUMMARY OF THE INVENTION

It is a primary object of the present invention to provide a system and method for determining the value of real estate which is more accurate than methods heretofore known.

It is another object of the present invention to provide a system and method for determining the value of real estate based on property tax and other property assessment data.

It is yet another object of the present invention to provide a system and method for determining the value of real estate which is trusted by sellers, buyers, appraisers, bankers and investors in the secondary market of mortgages.

It is still another object of the present invention to save time in determining values of property.

It is yet another object of the present invention to provide long term storage of comparative values.

Briefly, the present invention relates to a system and method for determining comparative values of comparable properties based on combining and comparing assessment data and sales data of the comparable properties to ultimately determine a value for a particular property, called the subject property.

In theory, tax assessors evaluate the value of property in the same manner as a bank appraiser, by the comparative market analysis (CMA) technique. The tax assessor applies a formula to that value to determine property taxes. The property may be reviewed periodically. Once the assessed value is determined, a phase-in formula may be used to increase the value every year for a definite period of years. The tax assessment related value may be property tax, "assessed value" or "phase value", all of which are referred to hereinafter generally under the term "assessment percentage". Therefore, according to the present invention, by knowing the property taxes paid on property, it is possible to determine the value of property by applying a processing scheme to the tax assessment data. A comparison is made of recently sold and unsold property to determine a factor. This factor is then applied to data concerning the subject property to determine the value of the subject property. In jurisdictions having multiple assessment percentage vales, it is contemplated that the present invention may be performed independently using each valve, and the results of each computation compare with each other, to serve as a check and balance.

For example, if a subject property has property taxes at $1,000 per year and a sold property has property taxes at $1,200 per year and sold for $120,000, it is desirable to know what the subject property is worth in relation to the sold property. The present invention determines how much that difference is.

According to a first embodiment of the present invention, the "base property tax" for the subject property and comparable property is determined by subtracting from the total property tax any front foot benefit charges (FFBC) and other special charges. Next, a price/tax factor is computed for each comparable property by dividing the sold (or for sale) price of the comparable property by its base tax. The price/tax factor for each comparable property is then multiplied by the "base property tax" of the subject property to generate a net comparative value for each comparable property.

To take into account appreciation for recently sold comparable properties, an average appreciation is obtained for the area in which the subject and comparable properties are located. The average appreciation is pro rated to determine the comparative value for each comparable property. Finally, on the basis of the comparative values and other pertinent information, the value of the subject property may be set.

According to the second embodiment of the present invention, the "assessed value" of the subject and comparable properties are used to determine the comparative values. A price/assessment percentage factor is computed for each comparable property, much the same way as the price/base tax factor in the first embodiment. Next, a net comparative value for each comparable property is computed by multiplying the price assessment percentage factor for each comparable property by the assessed value of the subject property. Then, appreciation is accounted for on a pro rated basis in the same manner as in the first embodiment.

According to the third embodiment, the "phase-in value" of the subject and comparable properties is used to generate the price/assessment percentage factor. Next, a net comparative value for each comparable property is computed by multiplying the price/assessment percentage factor for each comparable property by the phase value of the subject property. Then, appreciation is accounted for on a pro rated basis in the same manner as the first and second embodiments.

In each of the embodiments, the net comparative values may be adjusted for improvements to property and/or terms of the sales contract for sold comparable properties.

The terms "phase-in value" and "assessed value" may have specific meanings in particular jurisdictions. However, they may be used in other jurisdictions under different terms.

The above and other objects and advantages of the present invention will become more readily apparent when reference is made to the following description taken in conjunction with the accompanying drawings.

BRIEF DESCRIPTION OF THE DRAWINGS

FIGS. 4–11 are illustrations of the display screens used to enter the information concerning the subject and comparable properties.

FIGS. 12 and 13 are sample computer print outs of the results according to the first embodiment of the present invention.

FIGS. 15 and 16 are sample computer print outs of the results according to the second embodiment of the present invention.

FIGS. 18 and 19 are sample computer print outs of the results according to the third embodiment of the present invention.

DETAILED DESCRIPTION OF THE DRAWINGS

Glossary of Terminology

Assessment Percentage

A general term used to describe the tax assessed parameter of a subject property or comparable property. It may include a phase value, a base tax or an assessed value, as well as other values assigned various terms in different jurisdictions, which relate to the value of the property.

Price/Assessment Percentage Factor

The result of the division of the sales price by the assessment percentage.

Net Comparative Value

The property value determination reached by the inventive system and process before adjustments are made.

Comparative Value

The result when adjustments are made to a net comparative value for appreciation, improvements made after the tax assessed date, sales concessions, etc.

Base Tax

The total property tax minus FFBC and municipal charges. It is the true property tax on a property based on its value before county and state charges.

Price/Tax Factor

The result of the division of the sales price by the base tax.

Figure 1:
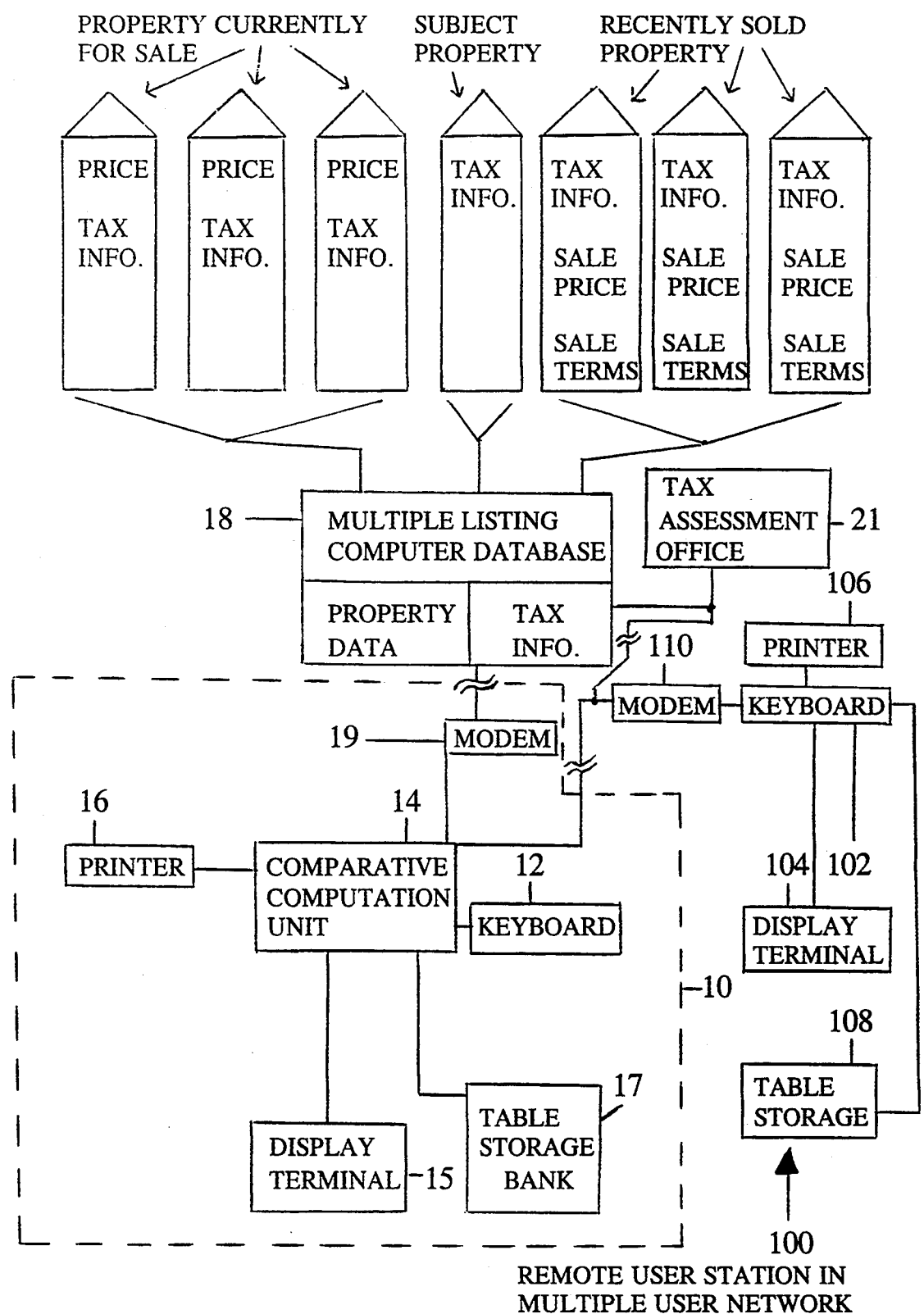
FIG. 1 is a block diagram of the system according to the present invention.

With reference first to FIG. 1, the present invention relates to determining value for a subject property, based on comparative values computed for each of the sold and currently for sale comparable properties. The number of sold and for sale comparable properties could be less than or more than that shown. The computation of the comparative values involves applying a processing scheme to the tax assessment data for each comparable property to determine a factor. This factor is then used to determine the approximate comparative values of the comparable properties.

Shown in FIG. 1 is the system 10 according to the present invention. The system 10 comprises a keyboard 12, a comparative computation unit 14, a display terminal 15, a printer 16, a table storage bank 17, and modem 19 (the purpose of which is described hereinafter). The keyboard 12 and display terminal 15 are used to enter the data concerning each of the comparable properties and the subject property (FIGS. 4–11). As will be described hereinafter in more detail, this data includes assessment data and property data. "Property data" includes current selling price or sales price if recently sold, number of months since sales contract if recently sold, terms of the sales contract such as seller paid closing costs and finance fees (points) and information concerning the features and amenities of the property/house. "Assessment data" is data related to the "assessment percentage", including tax rate, tax district, and the property tax, "assessed value" and "phase value". The comparative computation unit 14 operates on the data supplied by the keyboard, and in particular the "assessment percentage" and sales data, to compute comparative values for each of the comparable properties. Comparative computation unit 14 is a computer such as personal computer, or a larger mainframe computer, which runs computer program code for implementing the assessment analysis and has internal storage memory for storing the program code and also interacts with the table storage bank 17 for storing and retrieving data related to the various properties. The comparative values are ultimately displayed on display terminal 15, and printed out by the printer 16 together with other information on each of the comparable properties and the subject property.

Figure 20:
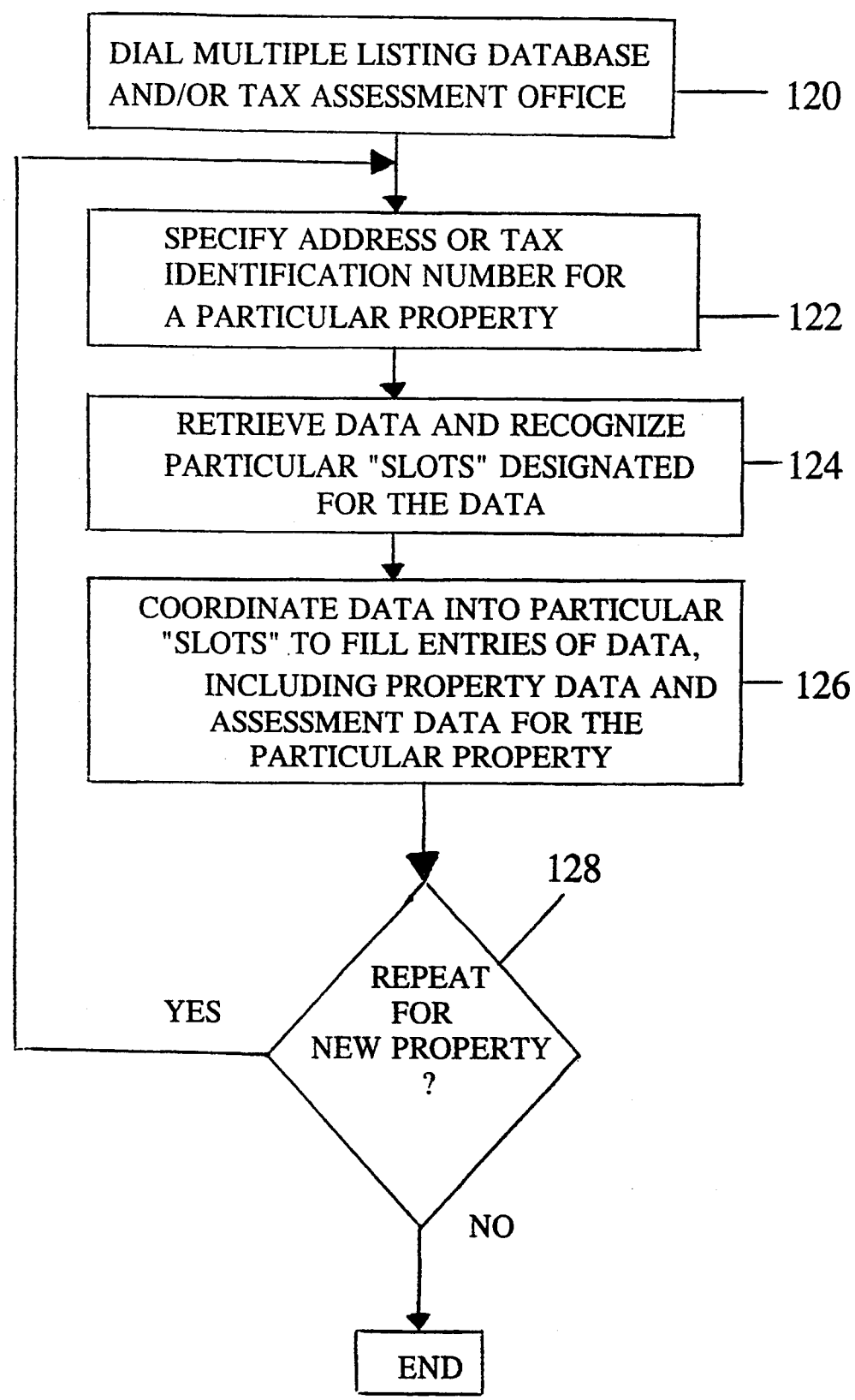
FIG. 20 is a flow chart diagram illustrating the steps of downloading property and assessment data from a multiple listing database, which data is automatically operated on by the present invention.

Alternatively, the assessment and property data concerning the comparable properties and subject property may be accessed and downloaded from a multiple listing computer database 18 via modem 19, under control of the comparative computation unit 14. Most multiple listing computer databases store property data and may also store tax information for properties, as shown schematically in FIG. 1. If the tax data is not stored in the database 18, it may be automatically downloaded from a tax assessment office 21, if the office has automated facilities; or other available data base access to the database 18 from the comparative computation unit 14 (FIG. 20).

Figure 2:
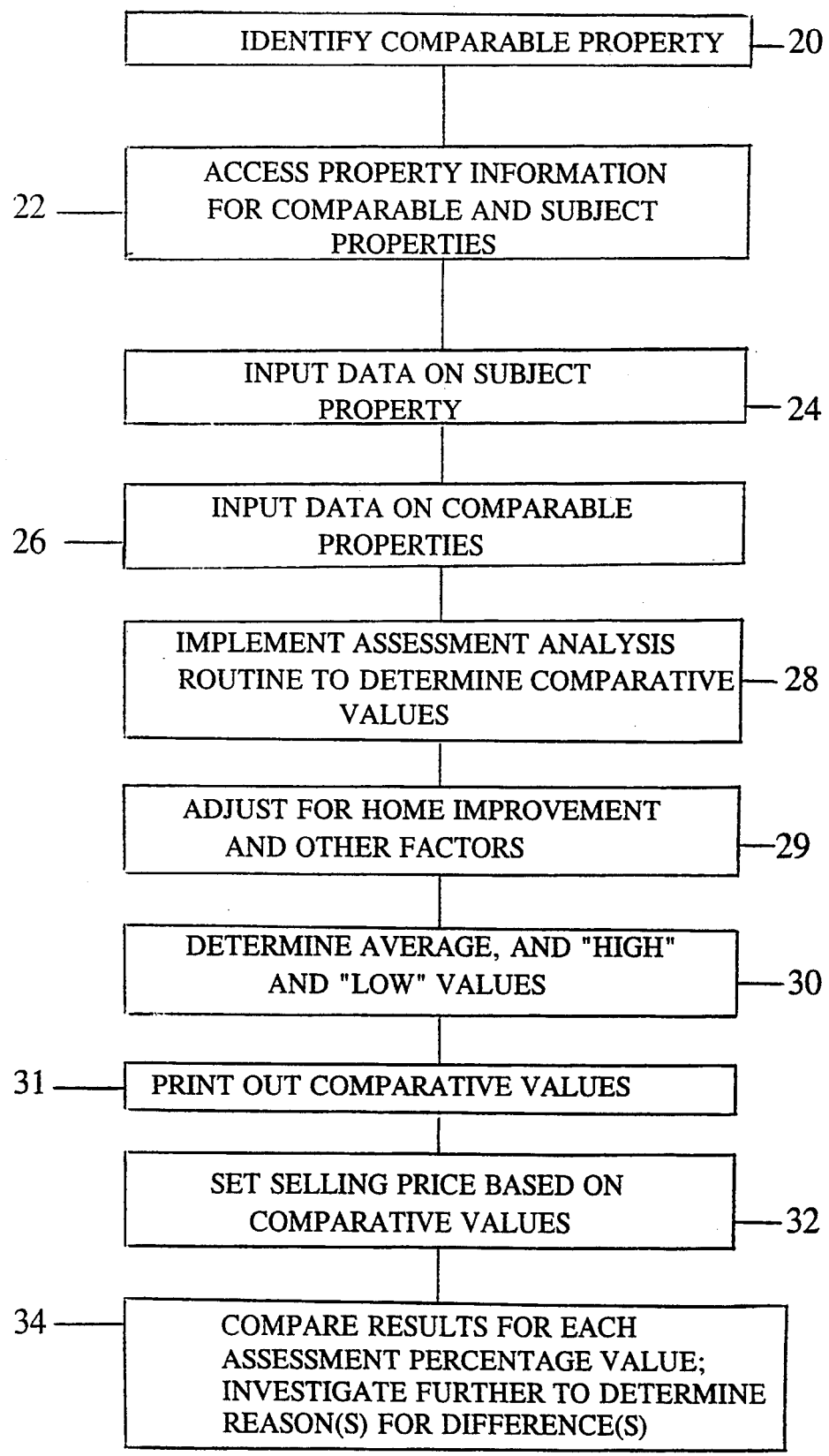
FIG. 2 is a flow chart illustrating generally the steps of the method according to the present invention.

Turning to FIG. 2, a general outline of the steps according to the present invention are shown. The first step which is necessary in the first embodiment is to identify comparable property (recently sold and currently for sale) in the same tax district and class (and hence same tax rate) as the subject property, shown at step 20. This may be done through the use of the table of data stored in the storage bank 17, as will be explained hereinafter, or by "in-the-field" investigations. It is preferable, but not necessary, that the comparable properties be in the same general location or neighborhood, and perhaps even the same street, to serve as the best "comparable properties". Next, in step 22, the property information including assessment data and property data for the comparable properties are accessed. The assessment data may be obtained directly by accessing the database 18, or tax assessment records for a particular jurisdiction. Next, the user inputs the assessment data and property data for the subject property in step 24 and then for the comparable properties in step 26. In sum, the total of the assessment data and property data includes a wide variety of information (FIG. 4) including the address of the property; property tax information including total property tax, "assessed value" and/or "phase value" FFBC and any other special taxes; features of the property; sales data for the comparable properties (if sold) and number of months since the sales contract for sold properties. Again, the data in steps 24 and 26 may be obtained directly from the database 18. Reference is made hereinafter to FIGS. 4–11 which illustrate the manner in which the data of the subject and comparable properties is manually entered. In addition, a user can obtain and input average appreciation rates from the recently sold properties, the purpose of which is described hereinafter.

Then, as shown at step 28, the assessment analysis process is implemented in which the comparative values of the comparable properties are computed based on the assessment percentage and average appreciation information for the comparable properties, and the assessment percentage for the subject property. This is the process of the present invention and will be described in greater detail hereinafter with reference to FIGS. 3, 14 and 17.

Adjustments to the comparative values may be made in step 29 to take into account the presence of any home improvements made after the tax assessor set the value of the property or other factors including sale terms. The amount of the adjustment value depends on the type of home improvement and is generally set to the current market price to incorporate that feature in a newly built home.

Next, in step 30, the averages of the comparative values for the sold and for sale comparative properties are computed, as well as the "high" and "low" values. The "high value" is set to be five percent above the average value and the "low" value is set to be two percent below the average value, to account for better than average condition property and worse than average condition property, respectively, and to allow negotiating room. These percentages may be adjusted by the user. Banks and appraisers may not adjust.

In step 31 the comparative values for each comparable property together with the other information (average, "high" and "low" values), is printed out so that in step 32, the user may use the comparative values to set the value of the subject property.

Comparative valves may be generated for each assessment percentage value available in the jurisdiction and results compared with each other, as shown by step 34. Depending on the differences between the values, further "on site" or other investigation of the property may be appropriate.

Figure 3:
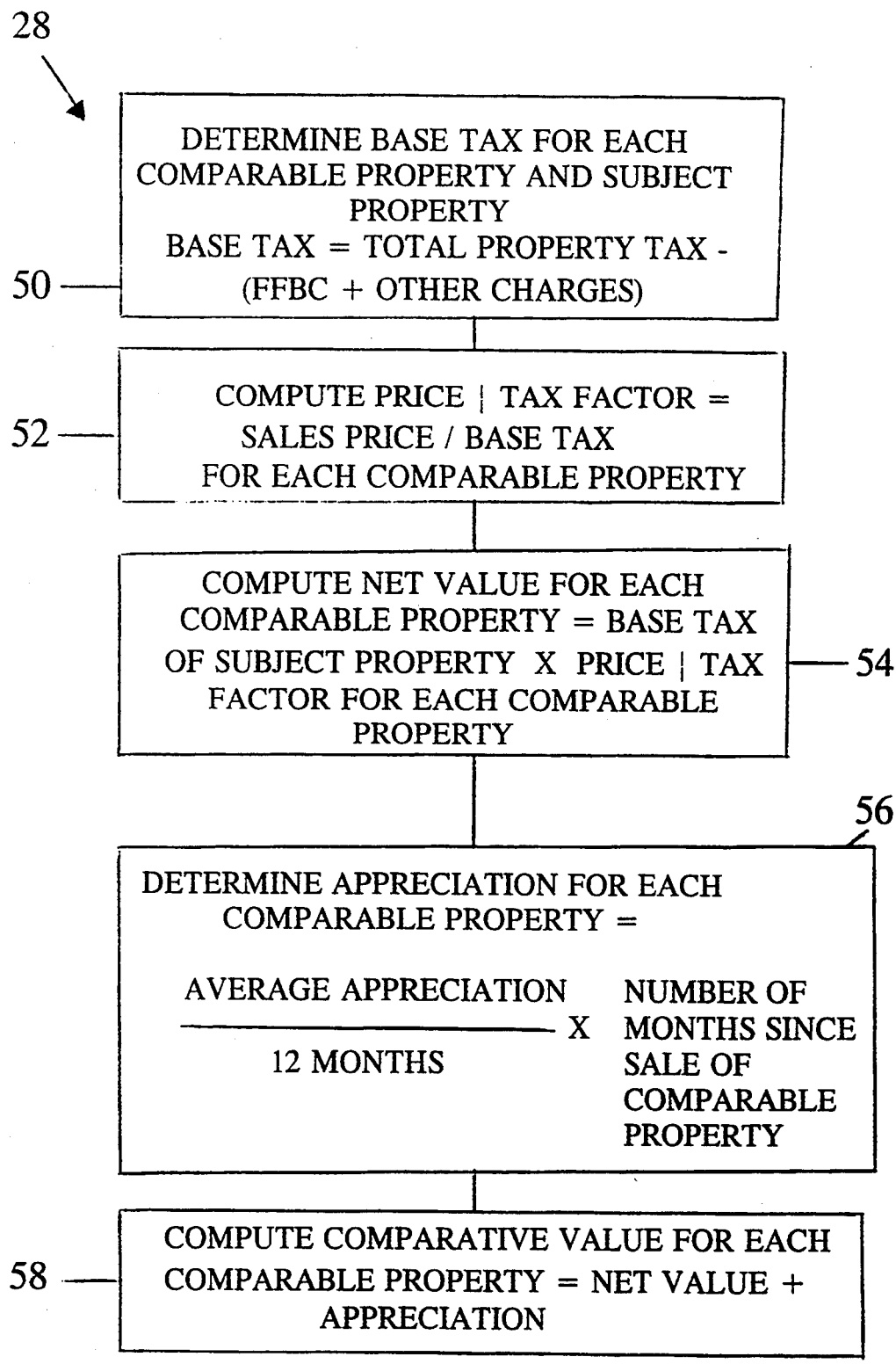
FIG. 3 is a flow chart illustrating in detail the steps for determining the comparative values of comparable properties according to the first embodiment of the present invention.

FIG. 3 shows the steps of the assessment analysis routine in detail according to the first embodiment. It is assumed that all information concerning the subject and comparable properties has been entered or downloaded into the comparative computation unit 14. In the first embodiment, the "assessment percentage" is the property tax. Initially, in step 50, the base tax is computed for each comparable property and the subject property by subtracting from the total tax FFBC and other special charges. Next, in step 52, a price/tax factor is computed for each comparable property by dividing into the sales price, the base tax for that property. Thus, each comparable property may have a unique price/tax factor. Then, in step 54, the net value for each comparable property is computed by multiplying the price/tax factor for each comparable property by the base tax of the subject property.

For the comparable properties which have recently been sold, i.e., in the last year, then it is necessary to account for the appreciation of these properties since the date of sale to bring the value current. To do this, one must obtain the average appreciation rate for the area in which the subject and comparable properties are located. This information can usually be obtained from a local realtor association, and also must be input for each comparable property in step 26 of FIG. 2. With this information, the pro rata appreciation rate of each comparable property is determined in step 56 by dividing the average appreciation rate by 12, then multiplying by the number of months since the sale of the property. The resulting number is a percentage, which when multiplied by the sale price of the property, results in the pro rata appreciation amount in dollars. The comparative value for each comparable property is then computed in step 58 by adding the net value (step 54) to the pro rata appreciation (step 56).

The comparative value information is also generated for unsold (currently on the market for sale) comparable property. For these properties, appreciation is not taken into account and the sales price in step 52 is rather the selling price. Therefore, step 56 is not implemented when operated on the data for these properties. However, the net value for each property is computed and is referred to as the comparative value.

FIGS. 4–11 illustrate the various screens generated by the computer program and displayed on the computer display terminal to prompt a user to enter the appropriate data. Referring to FIG. 4, the screen includes several key functions labelled for the corresponding function key on the keyboard 12. To proceed with entering data for analysis by the program, the tax account number for the particular piece of property must first be entered.

A screen for a single piece of property comprises two pages which are selected by using the PAGE UP and PAGE DOWN keys. The first page lists the features of the property (the aforementioned "property data"), called the feature page, and the second page lists the property tax data of the property (the aforementioned "assessment data"), called the formula page.

Data concerning a particular piece of property is stored in a table of data in the storage bank 17 and may be retrieved by selecting a street name, street number, or tax account number when the F5 key is depressed, as shown in FIG. 5. Data is saved by depressing the F2 key. Every time data is saved for a particular piece of property, all of the entered data is stored in the table of properties as shown in FIG. 5. Data may be overwritten on the screen and into the table. Each time data is updated for a particular piece of property and is saved, all previous data for that property is discarded unless saved to a back-up disk for long term storage. To expedite entering data for new properties, a user may select a property already in the table having characteristics in common with the new property and change only those features that are different, such as address, etc., and then store the data for the new property under a new tax identification number. The key is used to move the cursor to the next property in the table.

Referring to FIG. 6, the F3 key pulls up a window on the screen to allow the user to enter REMARKS, view and change the REMARKS while working on the same screen with all other property data visible.

To enter the property tax data for a particular piece of property, the user depresses the PAGE DOWN key and a screen similar to that shown in FIG. 7 is displayed. The tax data may then be entered into the appropriate spaces on the screen via the keyboard. For the second and third embodiments described hereinafter, the data for the assessed value or phase value is entered instead of the property taxes for the TAX BILL entry. No entry is made for FFBC or SPECIAL TAX.

FIGS. 4–7 are illustrations of the screens for the subject property. There are also screens for the comparable property sold and comparable property unsold. FIGS. 8 and 9 illustrate the feature and formula pages, respectively, for the sold comparable properties, which shows that portions of the feature and formula pages are combined so that the sales terms are displayed with the tax assessment data. Data is entered into the screen in the same manner as for the subject property, but data for three pieces of property are provided in separate columns on a single screen for the comparable property. Similarly, there are screens for the data of unsold comparable property, shown in FIGS. 10 and 11.

Once the data for the comparable property has been entered (or downloaded), the comparative computation unit 14 applies a processing method to the data to determine the price/assessment percentage factor for each comparable property. Once the data for the subject property is entered, the price/assessment percentage factors for each of the respective comparable properties are applied to the data for the subject property to compute the comparable values, as described above.

The F9 key is used to print the final report after the process is completed. The final report is different than what is displayed on the screen, as will be described hereinafter with reference to FIGS. 12, 13, 15, 16, 18 and 19. Shorter form print outs may be generated in which the property features are not included in the print out.

In the screens shown in FIGS. 9 and 11, the results of the process are shown for both a set of sold and a set of unsold comparable properties with respect to a particular subject property. The program displays the average value of sold and unsold properties and also the "high" and "low" values for the sold properties. The percentages for the "high" and "low" values may be adjusted manually by the user.

FIGS. 12 and 13 illustrate the print outs of the comparative values of each comparable property, with respect to the subject property. FIG. 12 is a print out showing the computed information such as base tax, price/tax factor, net value, and the ultimate comparative value for each of the comparable sold properties. In this example, it is seen that the base tax of the subject property is $1202, whereas the base taxes for the comparable properties are slightly higher. FIG. 13 illustrates the comparative values generated for comparable property not sold (for sale) in the area. The final numbers for the sold properties may be compared to those for the unsold properties to determine which properties may be overpriced or underpriced that are currently on the market. Attention should be paid to the underpriced properties for sale to determine why the property may be underpriced, when considering its impact on setting the value of the subject property.

The selling price for the subject property may be set according to the tax assessment analysis, together with any other factors, such as CMA analysis, gut feeling, experience in the neighborhood, etc.

When considering the numbers for the comparative properties sold, the low number should probably be discarded because the low price property may have been a distress sale, property in poor condition, etc. The high number may be relevant depending on the market and the magnitude of its difference from the other numbers. More than eight percent difference from the other numbers often means that the property was over improved, sold for cash, or in an instance where there was no appraisal. If enough comparables exist, properties sold over six months ago may not be given much weight because the older the sale, the larger the room for error when determining appreciation.

FIGS. 14–19 illustrate the second and third embodiments. In the second and third embodiments, a different value is used for the "assessment percentage". Specifically, a value called a "phase-in value" or "phase value" is used, which is a predetermined percentage of the total assessed value of the property, by the tax assessment office. The "phase-in value" in some jurisdictions operates on a three year cycle in which the projected increase in the value of the property is distributed evenly over the three years. For example, a property increasing in value from $72,000 to $84,000 would have a taxable value of $76,000 the first year, $80,000 the second year, and $84,000 the third year, for assessment purposes. The "phase value" changes the same in each tax district, but it is necessary to use properties having assessment percentage in the same tax year. In addition, an "assessed value" is used which is a predetermined percentage of the "phase-in value". These same values may be given different names in different jurisdictions. However, each is useful to determine the value of a subject property, particularly when the comparable property is subject to tax credits, which would artificially decrease the property tax, making the analysis according to the first embodiment possibly inaccurate.

Figure 14:
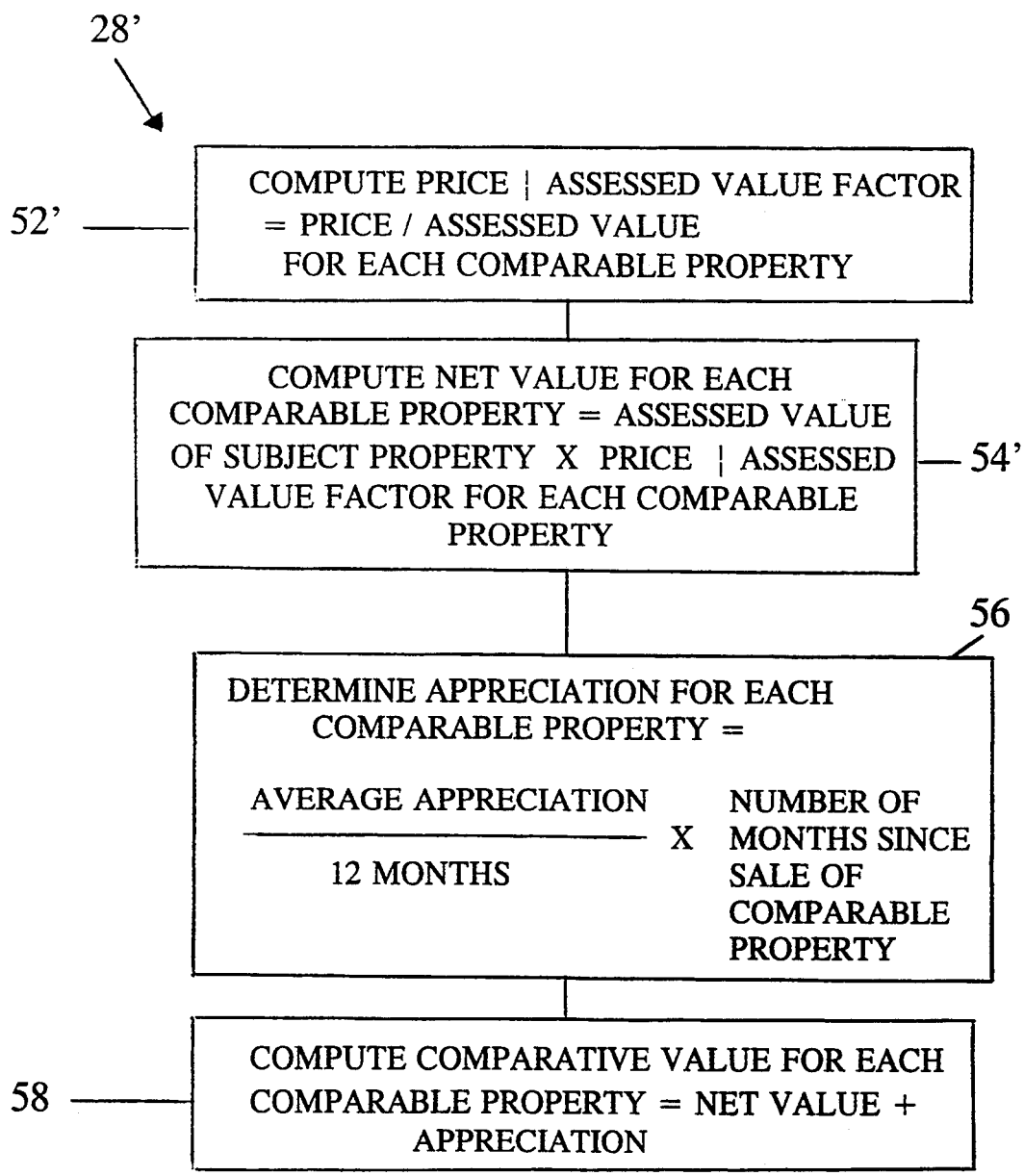
FIG. 14 is a flow chart illustrating in detail the steps of the method according to the second embodiment of the present invention.

The assessment routine 28' is similar to that shown in FIG. 3, but is modified as indicated by the prime to steps 52 and 54 in FIG. 14. Specifically, the assessment routine 28' differs from the routine 28 in that the "assessed value" of the subject and comparable properties are used to ultimately determine the comparative values. Again, these values may be downloaded directly from the database 18 with the other data or input via the keyboard 12 manually. A price/assessment percentage value factor is computed in step 52' for each comparable property, much the same way as the price tax factor in routine 28 Next, in step 54', a net value for each comparable property is computed by multiplying the price/assessment percentage factor for each comparable property by the assessed value of the subject property. Then, in steps 56 and 58, appreciation is accounted for on a pro rated basis in the same manner as routine 28 for sold comparable properties.

Figure 17:
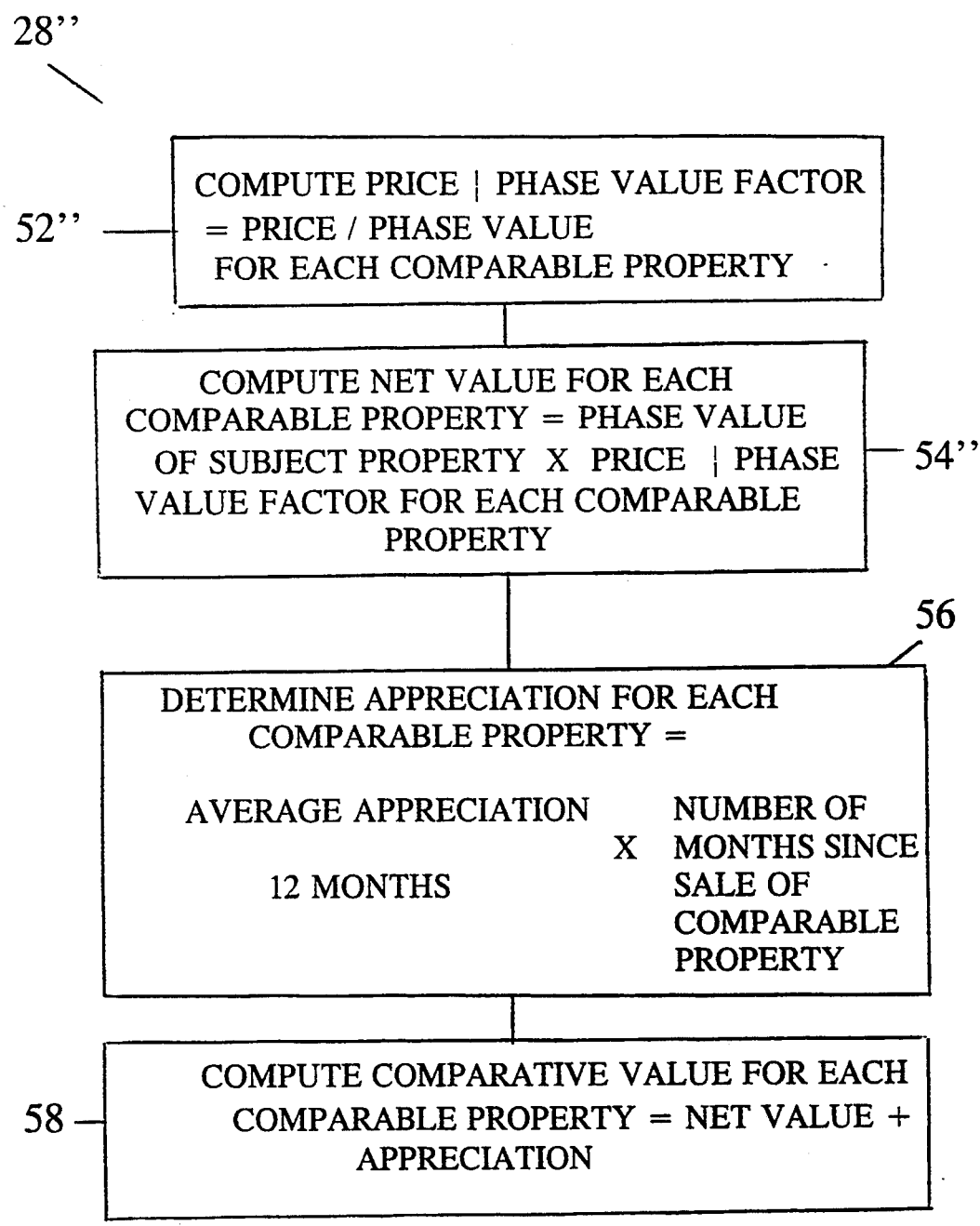
FIG. 17 is a flow chart illustrating in detail the steps of the method according to the third embodiment of the present invention.

According to the third embodiment shown in FIG. 17–19, the "phase value" of the subject and comparable properties are used, rather than property tax. In the assessment routine 28" a price/assessment percentage factor is generated in step 52". Next, in step 54", a net value for each comparable property is computed by multiplying the price/assessment percentage factor for each comparable property by the (phase value) assessment percentage of the subject property. Then, in steps 56 and 58, appreciation is accounted for on a pro rated basis in the same manner as routine 28 for the sold properties.

Much like the first embodiment, the second and third embodiments are implemented with unsold comparable property.

FIG. 20 illustrates the steps performed to access property and assessment data via telephone lines from MLS and the tax assessment records office. As mentioned above, this procedure may be performed in lieu of manually inputting the property and assessment data. However, it is envisioned that both options be concurrently available in the system 10.

Generally, the comparative computation unit 14 dials the multiple listing database 18 and retrieves data in the same manner as a conventional remote terminal accesses the database 18, which is known in the art. Specifically, in step 120, the multiple listing database is dialed via the modem 19. Next, in step 122, the user is prompted to enter the address or tax identification number of a particular property, which information is entered by the user in step 122. The data is then "downloaded" or retrieved from the database into the comparative computation unit 14 and each particular entry is automatically recognized as to its appropriate "slot" in step 124 The term "slots" refers to the particular property data and assessment data, shown in FIGS. 4–11, and also in the printouts of FIGS. 12, 13, 15, 16, 18 and 19. For example, the property tax, "assessed value" and "phase value" are recognized after their respective identification labels. The data is coordinated in steps 126 and stored in the appropriate "slots" in the feature page and formula page for that property, and the data is stored into the table storage bank, among the other stored data, available for access or immediate processing. Information for additional property may be obtained by the user responding accordingly in step 128. The data retrieved in steps 120–126 may be for a subject property or a comparable property, and replaces the manual input steps 24 and 26, in FIG. 2.

Referring again to FIG. 1, the system 10 may be embodied as a central mainframe database as part of a network, serving multiple remote user stations. For simplicity, only one such remote user station is shown at 100. A remote user station 100 comprises a keyboard 102, a display terminal 104, a printer 106 and a table storage device 108. The remote user station 100, which may be a portable unit, communicates with the system 10 and/or the multiple listing database 18, via a modem 110. The manner in which a remote user station communicates with the system 10 is essentially the same as a remote user station communicates with a multiple listing database, which is well known in the art.

The system 10 creates and shares data through the table storage bank 17, in much the same way that a multiple listing database shares data. Instead of sharing only property data and tax information, the system 10 shares comparative values and other information computed and compiled by the comparative computation unit, and stored in the table storage bank 17. Comparative analysis data already computed for a particular subject property can be retrieved from any remote user station. A user at a remote user station may request information from the system 10, which is retrieved from the table storage bank 17 and downloaded to the table storage device 108, of the corresponding remote user station. Remote user stations can also pull property data and tax information (by dialing the database 18 or by manual input from "in-the-field" investigation of records), compile and send such data to the table storage bank 17. Each remote user station may call the database 18 or system 10 to retrieve data, while working on the same file.

Moreover, each remote user station can compute comparative value data by accessing the system 10 for "processing time" on the comparative computation unit, using data input by the keyboard at the remote station or accessed from the multiple listing computer database 18. As explained hereinafter, the comparative value data may be sent to the system 10 for storage in the table storage bank 17, providing access to those results from other remote user stations.

The remote stations may compile data and send the data to the system 10 at night, where the data is stored in the table storage bank 17. This new data is logged in by geographical area or zip code by the system and made available to remote user stations. Certain remote user stations may be registered for particular geographical areas or zip codes, in which case the system 10 would send out updated information gathered the previous day from remote stations, to the remote stations assigned to particular zip codes. Of course, all remote user stations may call into the system 10 to access data for property in other areas or zip codes.

Although the remote user stations are shown to communicate with the system 10 by modem, it is envisioned that the system 10 could serve multiple work stations which have direct "hard-wired" access thereto, much like conventional intra-office or interoffice network systems. For example, a work station may be provided at each of several branches of a bank, real estate agency, etc., which access a centrally located mainframe system. The network may serve users in the same business or different businesses in the same network.

The above description is intended by way of example only and is not intended to limit the present invention in any way except as set forth in the following claims.

I claim:

1. A network for serving multiple user stations and providing data related to the value of a property upon a request being entered at a user station, the network comprising: a central unit for determining the value of a subject property comprising:

means for receiving via telephone lines requests from a plurality a user stations, said requests including a user specified subject property and comparable properties for which comparative value information is sought;

means for remotely accessing via telephone lines assessment data, sales data and property data of a plurality of properties, including subject property and comparable properties;

storage means for storing the property data and assessment data for the subject property and comparable property and sales data of the comparable properties, whereby property data and assessment percentage data for a particular property may be retrieved from said storage means by selecting an address or tax identification number of said particular property;

computer means connected to the storage means, means for receiving and means for remotely accessing, said computer control means, responsive to a request received by said means for receiving, for retrieving from said storage means an assessment percentage and property data if available for said subject property, selecting comparable properties, and determining a price/assessment percentage factor for each comparable property by dividing the selling price of each comparable property by the assessment percentage for the corresponding comparable property, and determining a net comparative value for each comparable property by multiplying the assessment percentage of the subject property by the corresponding price/assessment percentage factor for each comparable property; and a plurality of remote computer-controlled user stations and means at each remote user station for communicating with said central unit and exchanging data therebetween, each of said remote user stations comprising input means for specifying as a request to be transmitted at least a subject property for which comparative values are to be determined.

2. The system of claim 1, wherein each of said remote user stations includes printer means for printing out the comparative values for the computations in connection with the particular subject property and particular comparable properties.

3. The network of claim 2, wherein each of said remote user stations comprises display means for displaying property data and assessment data, as well as comparable values stored by the storage means of said central unit.

4. The network of claim 1, wherein each remote user station includes storage means for storing property data and assessment data for properties in table form, indexed to an address or tax identification number of the property.

5. The network of claim 4, wherein remote user stations are assigned for particular geographical areas, and the computer control means of the central unit sorts the property data and assessment data sent to the central unit by said plurality of remote user stations according to the particular geographical areas and transmits said data to the remote user stations for the corresponding geographical area for storage at the remote user station.

* * * * *

UNITED STATES PATENT AND TRADEMARK OFFICE
CERTIFICATE OF CORRECTION

PATENT NO. : 5,414,621
DATED     : May 9, 1995
INVENTOR(S) : John R. HOUGH

It is certified that error appears in the above-indentified patent and that said Letters Patent is hereby corrected as shown below:

```
Column 1, line 14, after "However," insert --the--;
         line 67, cancel "vales" and insert --values--.
Column 2, line 1, cancel "valve" and insert --value--;
         lines 1 and 2, cancel "compare" and insert
--are compared--.
Column 5, line 44, cancel "valves" and insert --values--.
Column 6, line 30, cancel "labelled" and insert --labeled--;
         line 59, before "key" insert --ARROW--.
Column 9, line 1, after "and" insert --/or--.
```

Signed and Sealed this

Fourteenth Day of May, 1996

Attest:

BRUCE LEHMAN

*Attesting Officer*       *Commissioner of Patents and Trademarks*